US008333008B1

(12) United States Patent
Sin et al.

(10) Patent No.: US 8,333,008 B1
(45) Date of Patent: Dec. 18, 2012

(54) METHOD FOR MANUFACTURING A PERPENDICULAR MAGNETIC RECORDING TRANSDUCER

(75) Inventors: Kyusik Sin, Pleasanton, CA (US); Lei Wang, Fremont, CA (US); Yingjian Chen, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 1892 days.

(21) Appl. No.: 11/192,591

(22) Filed: Jul. 29, 2005

(51) Int. Cl.
*G11B 5/127* (2006.01)
*H04R 31/00* (2006.01)

(52) U.S. Cl. ............... 29/603.16; 29/603.11; 29/603.13; 29/603.14; 29/603.15; 29/603.18; 216/22; 216/39; 216/41; 216/48; 216/62; 360/121; 360/122; 360/317; 451/5; 451/41

(58) Field of Classification Search .............. 29/603.11, 29/603.13–603.16, 603.18, 605, 606; 216/22, 216/39, 41, 48, 62, 65–67; 360/121, 123, 360/317; 451/5, 4
See application file for complete search history.

(56) References Cited

U.S. PATENT DOCUMENTS

| | | |
|---|---|---|
| 4,274,022 A | 6/1981 | Elsel |
| 4,404,609 A | 9/1983 | Jones, Jr. |
| 4,546,398 A | 10/1985 | Toda et al. |
| 4,636,897 A | 1/1987 | Nakamura et al. |
| 4,646,429 A | 3/1987 | Mori |
| 4,779,463 A | 10/1988 | Woodruf |
| 4,855,854 A | 8/1989 | Wada et al. |
| 4,943,882 A | 7/1990 | Wada et al. |
| 5,027,247 A | 6/1991 | Nakanishi |
| 5,181,151 A | 1/1993 | Yamashita et al. |
| 5,225,953 A | 7/1993 | Wada et al. |
| 5,393,233 A | 2/1995 | Hong et al. |
| 5,578,857 A | 11/1996 | Hong et al. |
| 6,261,918 B1 | 7/2001 | So |
| 6,292,329 B1 | 9/2001 | Sato et al. |
| 6,315,839 B1 | 11/2001 | Pinarbasi et al. |
| 6,353,995 B1 | 3/2002 | Sasaki et al. |
| 6,433,970 B1 | 8/2002 | Knapp et al. |
| 6,475,062 B1 | 11/2002 | Kubota et al. |
| 6,501,619 B1 | 12/2002 | Sherrer et al. |
| 6,504,675 B1 | 1/2003 | Shukh et al. |
| 6,513,228 B1 | 2/2003 | Khizroev et al. |
| 6,522,007 B2 | 2/2003 | Kouno et al. |
| 6,587,314 B1 | 7/2003 | Lille |
| 6,709,322 B2 | 3/2004 | Saldana et al. |
| 6,740,471 B1 | 5/2004 | Lu et al. |
| 6,743,642 B2 | 6/2004 | Costrini et al. |
| 6,751,054 B2 | 6/2004 | Sato et al. |
| 6,757,141 B2 | 6/2004 | Santini et al. |
| 6,784,548 B2 | 8/2004 | Kouno et al. |
| 6,795,277 B2 | 9/2004 | Tsuchiya et al. |
| 6,807,027 B2 | 10/2004 | McGeehin et al. |
| 6,808,442 B1 | 10/2004 | Wei et al. |

(Continued)

*Primary Examiner* — Paul D Kim

(57) ABSTRACT

A method and system for fabricating a perpendicular magnetic recording head, and the head so formed, are described. The method includes depositing an underlayer directly on an insulating layer. The underlayer preferably includes at least one of a nonferromagnetic metal, silicon oxide, and silicon nitride. A pole layer, which has a pole removal rate, is provided on the underlayer. The method and system further include forming a perpendicular magnetic recording pole from the pole layer. The perpendicular magnetic recording pole has a top and a bottom that is narrower than the top. The process of forming the perpendicular magnetic recording pole further includes removing a portion of the pole layer such that a pole removal rate for the pole layer is less than or substantially equal to a removal rate of the underlayer during the removing step.

26 Claims, 12 Drawing Sheets

U.S. PATENT DOCUMENTS

| | | |
|---|---|---|
| 6,809,899 B1 | 10/2004 | Chen et al. |
| 6,833,979 B1 | 12/2004 | Knapp et al. |
| 6,836,957 B2 | 1/2005 | Kobayashi |
| 6,843,707 B2 | 1/2005 | Saldana et al. |
| 6,876,518 B2 | 4/2005 | Khizroev et al. |
| 6,876,519 B1 | 4/2005 | Litvinov et al. |
| 6,952,867 B2 | 10/2005 | Sato |
| 6,960,281 B2 | 11/2005 | Han et al. |
| 7,024,756 B2 | 4/2006 | Le et al. |
| 7,132,221 B2 | 11/2006 | Chen et al. |
| 7,206,166 B2 * | 4/2007 | Notsuke et al. ............... 360/122 |
| 7,227,720 B2 * | 6/2007 | Sasaki et al. ............. 360/125.12 |
| 7,296,339 B1 | 11/2007 | Yang et al. |
| 7,518,824 B2 | 4/2009 | Sasaki et al. |
| 7,552,523 B1 | 6/2009 | He et al. |
| 7,911,735 B1 | 3/2011 | Sin et al. |
| 2001/0008501 A1 | 7/2001 | Sekine |
| 2001/0035357 A1 | 11/2001 | Sasaki |
| 2002/0006013 A1 | 1/2002 | Sato et al. |
| 2002/0012195 A1 | 1/2002 | Lahiri et al. |
| 2002/0012196 A1 | 1/2002 | Obara |
| 2002/0151254 A1 | 10/2002 | Saldana et al. |
| 2002/0190382 A1 | 12/2002 | Kouno et al. |
| 2002/0191336 A1 | 12/2002 | Hsiao et al. |
| 2003/0038064 A1 | 2/2003 | Harbeck et al. |
| 2003/0039064 A1 | 2/2003 | Khizroev et al. |
| 2003/0071263 A1 | 4/2003 | Kouno et al. |
| 2003/0117749 A1 | 6/2003 | Shukh et al. |
| 2004/0001283 A1 | 1/2004 | Fontana et al. |
| 2004/0008446 A1 | 1/2004 | Schmidt |
| 2004/0008451 A1 | 1/2004 | Zou et al. |
| 2004/0032692 A1 * | 2/2004 | Kobayashi ................... 360/126 |
| 2004/0075927 A1 | 4/2004 | Gill |
| 2004/0102138 A1 | 5/2004 | Saldana et al. |
| 2004/0150912 A1 | 8/2004 | Kawato et al. |
| 2004/0161576 A1 | 8/2004 | Yoshimura |
| 2004/0252415 A1 | 12/2004 | Shukh et al. |
| 2004/0257711 A1 | 12/2004 | Ushiyama et al. |
| 2005/0011064 A1 | 1/2005 | Lee |
| 2005/0024779 A1 | 2/2005 | Le et al. |
| 2005/0068671 A1 | 3/2005 | Hsu et al. |
| 2006/0044681 A1 | 3/2006 | Le et al. |
| 2006/0109588 A1 | 5/2006 | Le et al. |
| 2006/0139802 A1 | 6/2006 | Sasaki et al. |
| 2006/0168603 A1 | 7/2006 | Goto |
| 2008/0148301 A1 | 6/2008 | Masaoka et al. |
| 2008/0184278 A1 | 7/2008 | Leigh et al. |
| 2008/0278861 A1 | 11/2008 | Jiang et al. |
| 2008/0297945 A1 | 12/2008 | Han et al. |
| 2010/0078406 A1 | 4/2010 | Guthrie et al. |
| 2010/0113486 A1 | 5/2010 | Bergmann et al. |

* cited by examiner

METHOD FOR MANUFACTURING A PERPENDICULAR MAGNETIC RECORDING TRANSDUCER

FIELD OF THE INVENTION

The present invention relates to magnetic recording technology, and more particularly to a method and system for fabricating a perpendicular recording transducer.

BACKGROUND OF THE INVENTION

FIG. 1 depicts a portion of conventional head 1 including a conventional perpendicular magnetic recording (PMR) transducer 10 and conventional read transducer 40 separated by an insulator 6, as viewed from the air-bearing surface (ABS). For clarity, the conventional PMR transducer 10 is not drawn to scale. Also depicted is the substrate 2, which may be part of a body of a slider (not separately depicted in FIG. 1). The conventional PMR transducer 10 includes a conventional first pole 12, alumina insulating layer 14, alumina underlayer 16 that may be considered part of the alumina insulating layer 14, conventional PMR pole 18 that typically includes a seed layer (not shown), insulating layer 20, shield gap 26, top shield 28, and insulating layer 30. Note that in certain other embodiments, the top shield 28 may also act as pole during writing using the conventional PMR transducer 10. The conventional PMR pole 18 and the top shield 80 are surrounded by insulating layers 20 and 30, respectively. The conventional PMR pole 18 has sidewalls 22 and 24.

In conventional applications, the height of the conventional PMR pole 18 is typically less than approximately three-tenths micrometer. The conventional PMR pole 18 also has a negative angle such that the top of the conventional PMR pole 18 is wider than the bottom of the conventional PMR pole 18. Stated differently, the angle θ of the sidewalls is less than 90 degrees in the conventional PMR pole 18 of FIG. 1. A pole having this height and shape is desirable for use in PMR applications.

FIG. 2 depicts a conventional method 50 for forming the conventional PMR transducer 10. For simplicity, some steps are omitted. The high magnetic moment material for the conventional PMR pole 18 is deposited, via step 52. A chemical mechanical planarization (CMP) stop layer and hard mask layer are deposited, via step 54. A seed layer is deposited, via step 56. A resist pattern for the hard mask layer is formed on the seed layer, via step 58. Step 58 typically includes providing a layer of photoresist and patterning the layer to provide the desired mask. The ion milling mask is plated and the photoresist removed, via step 60. Thus, the ion milling mask is used to mask the desired portions of the high moment material to be used to form the conventional PMR pole 18. The PMR pole material is milled, via step 62. Consequently, the width of the conventional PMR pole 18 and the negative angle are set in step 62. The insulator 20 is deposited around the conventional PMR pole 18, via step 64. A CMP is performed to planarize the surface and expose the conventional PMR pole 18, via step 66. The surface is planarized in order to allow subsequent processing to be performed as desired. The shield gap 26 is provided, via step 68. The top shield 28 is deposited and patterned in step 70. Finally, the region around the top shield 28 is insulated, via step 72.

Although the conventional method 50 can be used to form a conventional PMR transducer 10, the process utilized to trim the conventional PMR pole 18 results in artifacts which adversely affect the functioning of the conventional PMR transducer 10. In particular, the sidewalls 22 and 24 of the conventional PMR pole 18 may include one or more angles. Such a condition, in which each sidewall 22 and 24 includes an angle, is depicted in FIG. 1. The desired profile of the conventional PMR pole 18 is a trapezoid. Consequently, such nonuniformities in the sidewalls 22 and 24 are undesirable. In addition, footings 23 and 25 may be present at the base of the PMR pole 18. The footings 23 and 25 are composed of the material(s) used in forming the pole. Other artifacts may include increased roughness of the sidewalls 22 and 24 as well as redeposition of the pole material being trimmed. These artifacts of the pole trim are generally undesirable.

Accordingly, what is needed is an improved method for fabricating a PMR head.

SUMMARY

A method and system for providing a perpendicular magnetic recording head, and the head so formed, are disclosed. The method comprises depositing an underlayer directly on an insulating layer. The underlayer may include at least one of a nonferromagnetic metal, silicon oxide, and silicon nitride. A pole layer, which has a pole removal rate, is provided on the underlayer. The method and system further comprise forming a perpendicular magnetic recording pole from the pole layer. The perpendicular magnetic recording pole has a top and a bottom that is narrower than the top. The forming the perpendicular magnetic recording pole further includes removing a portion of the pole layer such that a pole removal rate for the pole layer is less than or substantially equal to a removal rate of the underlayer during the removing step.

DETAILED DESCRIPTION OF THE PREFERRED EMBODIMENTS

Figure 3A:
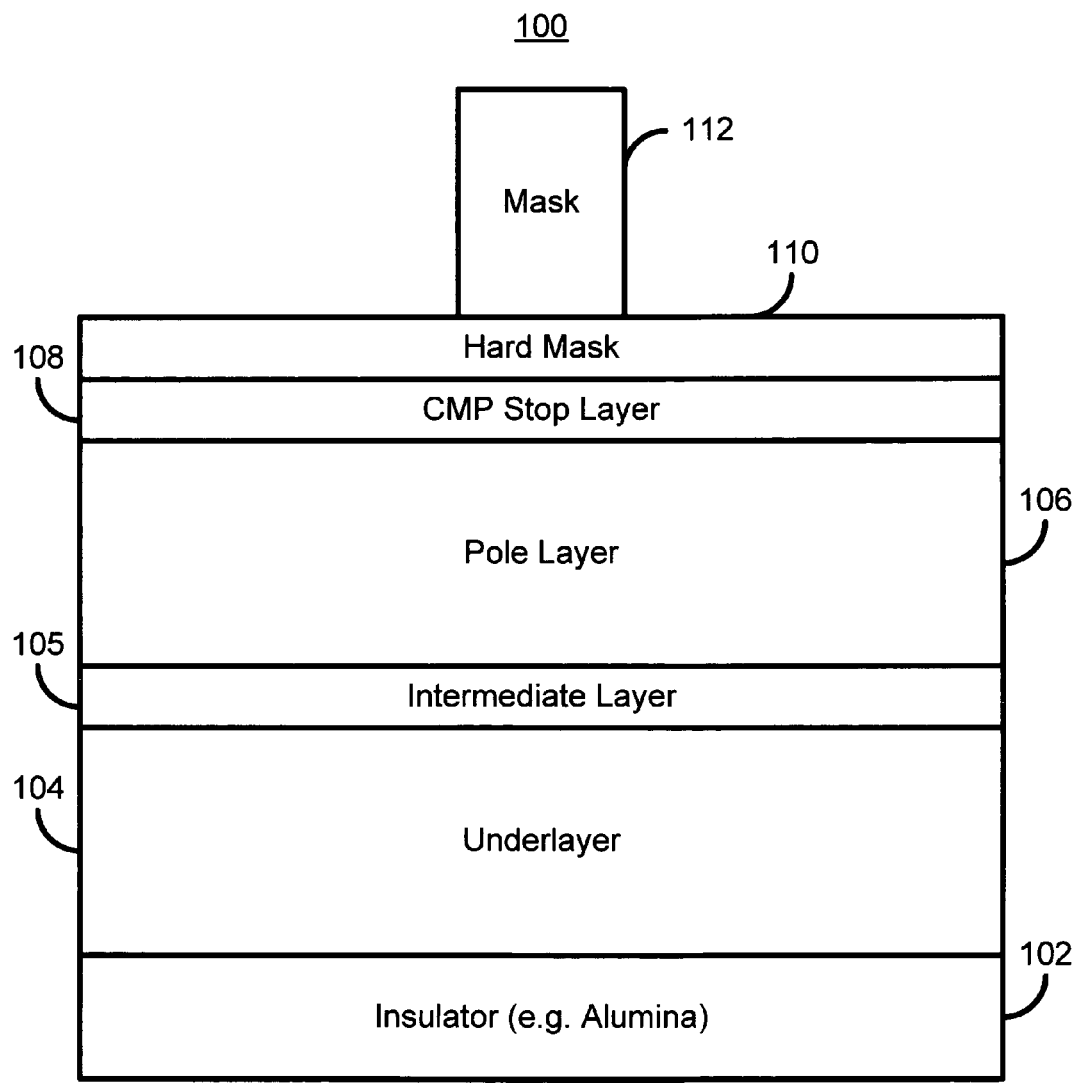
FIGS. 3A-3C depict a perpendicular magnetic recording pole formed in accordance with an exemplary embodiment of the present invention.
Figure 3B:
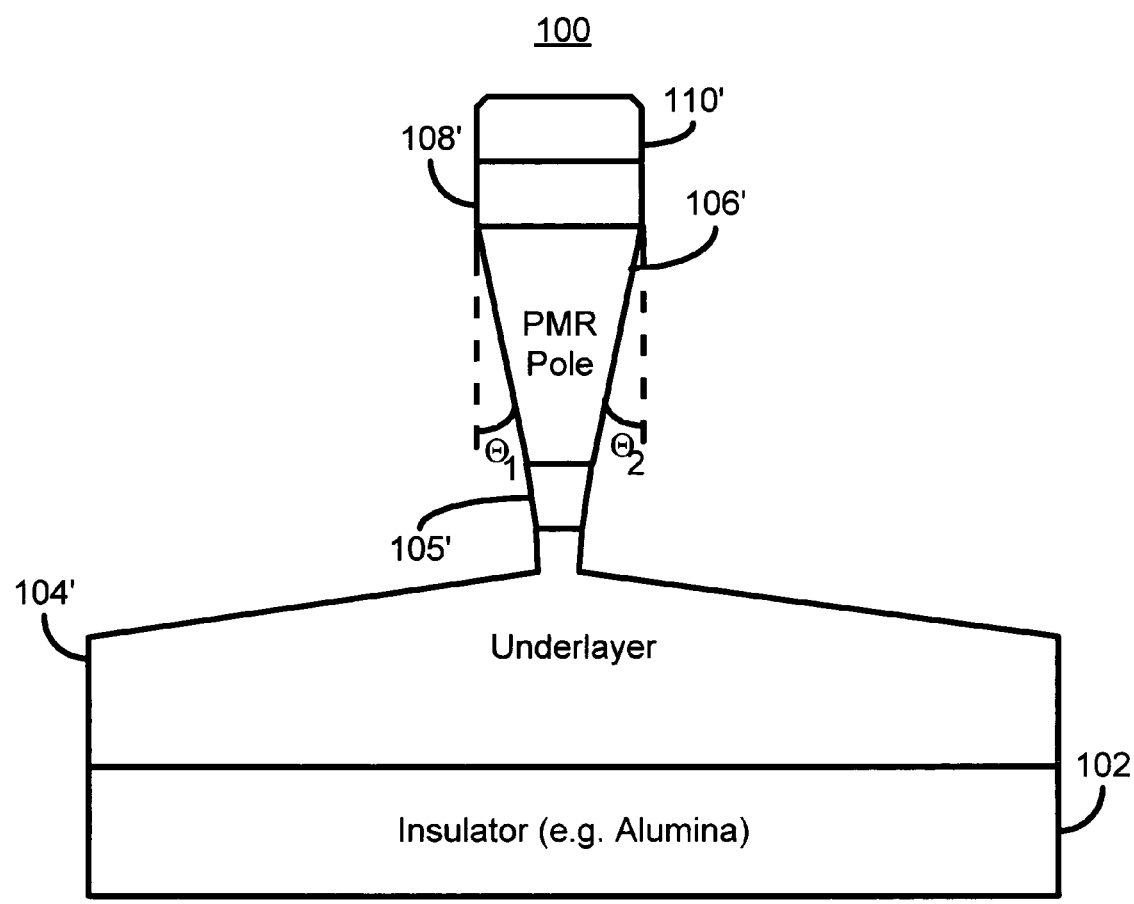
Figure 3C:
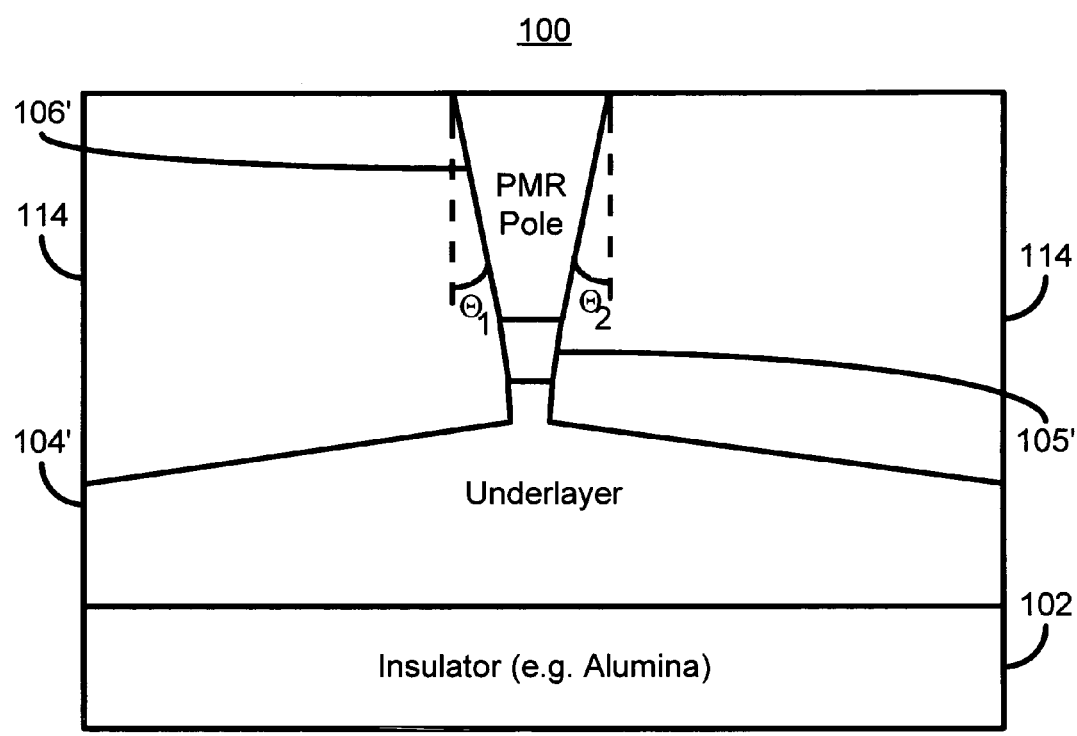

FIGS. 3A-3C depict a portion of a PMR transducer 100 formed in accordance with an exemplary embodiment of the present invention during various stages of fabrication. To enhance clarity FIGS. 3A-3C are not drawn to scale. FIG. 3A depicts an insulator 102, underlayer 104, an optional intermediate layer 105, PMR pole layer 106, a chemical mechanical planarization (CMP) stop layer 108, hard mask 110, and mask 112. The underlying insulator 102 may includes materials such as $Al_2O_3$. The underlayer 104 resides directly on the insulator 102. The underlayer 104 preferably is a nonferromagnetic metal, silicon oxide, or silicon nitride. For example, the underlayer 104 may include NiNb, Ru, Rh, and NiFeCr. In one embodiment, the underlayer 104 includes a NiNb/Ta bilayer. In another embodiment, the underlayer 104 may be a laminate of multiple layers, which may include the materials NiNb, Ru, Rh, and NiFeCr. In one embodiment, the underlayer 104 thickness is between five hundred and three thousand Angstroms. The thickness of the underlayer 104 is preferably substantially the same as the pole layer 106. However, in another embodiment, the underlayer 104 may have another thickness. The intermediate layer 105 is optional. When used, the intermediate layer 105 preferably includes materials such as Ta. The thickness of the intermediate layer 105 is less than or substantially equal to one thousand Angstroms. However, in a preferred embodiment, the thickness of the intermediate layer 105 is less than or substantially equal to one hundred Angstroms. In a preferred embodiment, if the intermediate layer 105 is present, then the underlayer 104 is a NiNb/Ta bilayer. Consequently, the combination of the underlayer 104 and the intermediate layer 105 form a Ta/NiNb/Ta trilayer. The PMR pole layers 106 are magnetic and formed on the underlayer 104, preferably after a seed layer (not shown) is provided. The CMP stop layer 108 preferably includes materials such as Ta and TaN. The hard mask 110 may include $Al_2O_3$. The mask 112 is preferably either photoresist mask or a NiFe hard mask.

FIG. 3B depicts the PMR transducer 100 after the pole trim has been performed, preferably using ion milling, in order to define the PMR pole 106' depicted. Consequently, the PMR pole 106' has been formed. The PMR pole 106' has a negative angle, allowing the top of the PMR pole 106' to be wider than the bottom, as shown in FIG. 3B. During the pole trim, the underlayer 104 and intermediate layer 105 are also etched, leaving the underlayer 104' and the intermediate layer 105', respectively. During the pole trim that forms the PMR pole 106', the removal rate of the PMR pole layer 106 is less than or substantially equal to a removal rate of the underlayer 104. Consequently, the underlayer 104' has the profile depicted. Also shown are remaining hard mask 110' and CMP stoop layer 108'.

FIG. 3C depicts the PMR transducer 100 after further processing. The hard mask 110' and CMP stop layer 108' have been removed. Insulating layer 114 has been formed. Although not depicted, other structures may be formed. Fore example, a shield gap (not shown) and shield (not shown) may also be formed.

Because the removal rate of the PMR pole layer 106 is less than or substantially equal to a removal rate of the underlayer 104 during the pole trim, the sidewalls 105 and 107 of the PMR pole 106' are substantially free of angles and, therefore, preferably substantially planar. Thus, the cross section of the PMR pole 106' is a trapezoid. In addition to being more uniform, the angles, $\theta_1$ and $\theta_2$, the sidewalls 105 and 107 make with vertical may be closer to the desired. In a preferred embodiment, the angles $\theta_1$ and $\theta_2$ are each at least approximately between two and fifteen degrees, and more preferably between five degrees and eight degrees. Moreover, footings at the base of the PMR pole 106' may be reduced or eliminated. In addition to improvements in the uniformity of the angles $\theta_1$ and $\theta_2$, track width uniformity, and sidewall 105 and 107 profile, the trim process that forms the PMR pole 106' may be more efficient. Consequently, performance and fabrication of the PMR transducer 100 may be improved.

Figure 1:
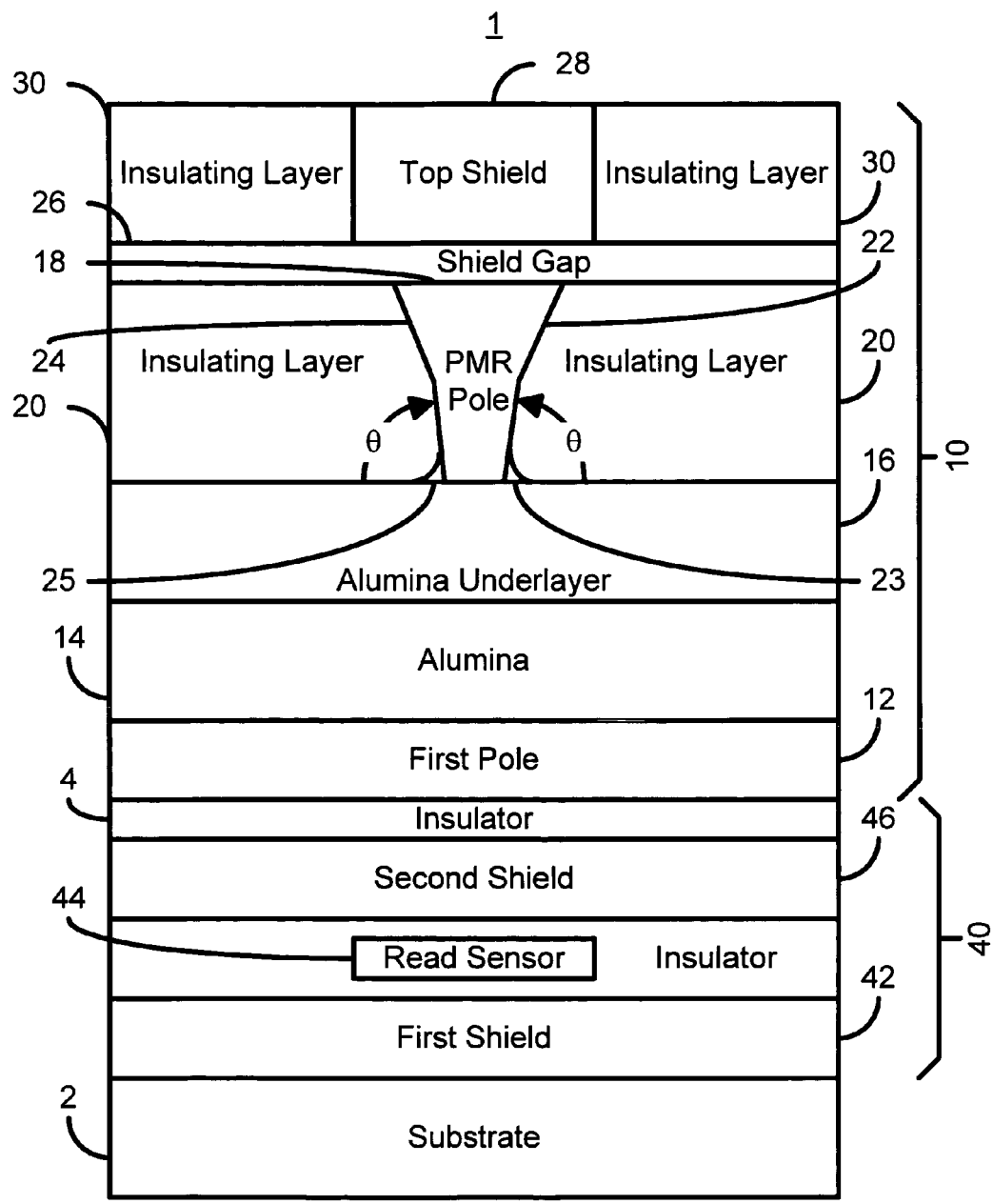
FIG. 1 is diagram depicting a conventional perpendicular magnetic recording head.
Figure 2:
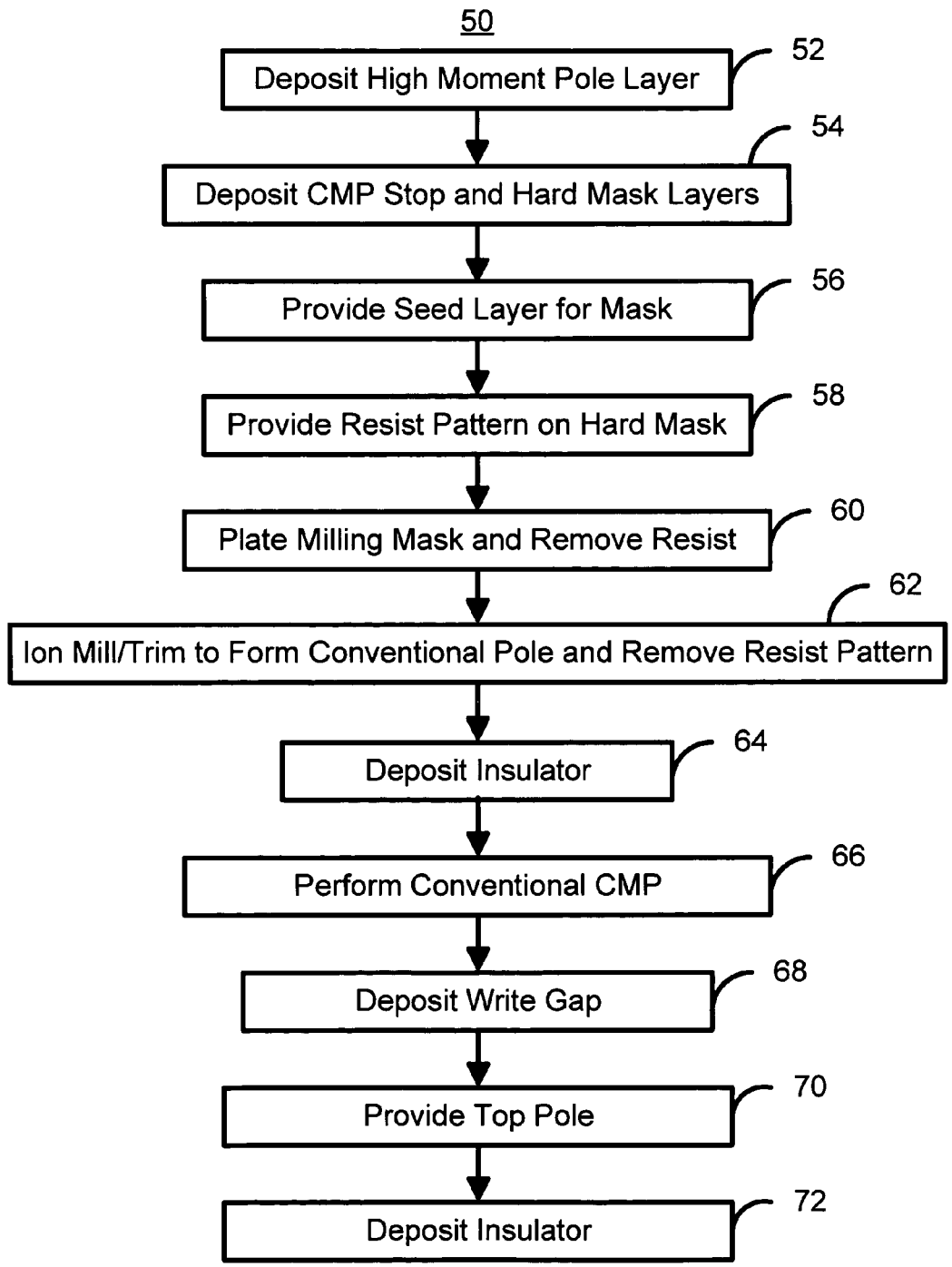
FIG. 2 is a flow chart depicting a conventional method for fabricating a perpendicular magnetic recording pole.
Figure 4:
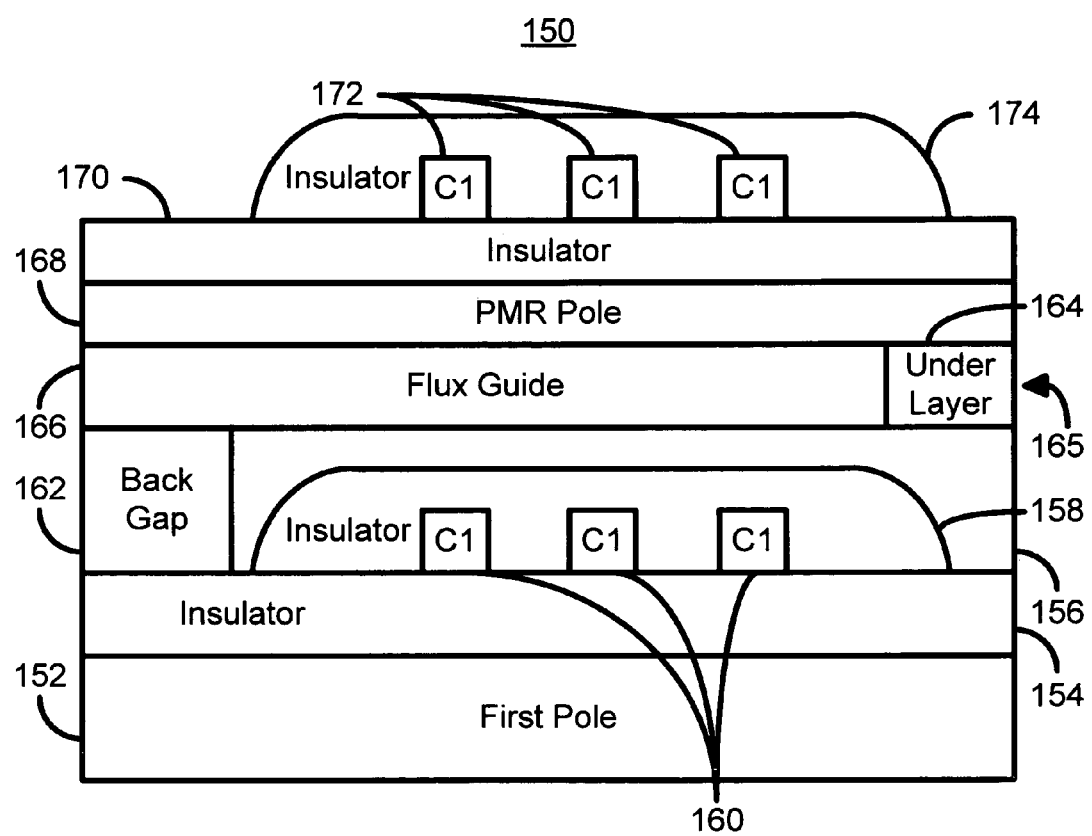
FIG. 4 depicts a perpendicular magnetic recording transducer formed in accordance with an exemplary embodiment of the present invention.

FIGS. 4-9 depict various embodiments of the PMR transducer 100, including underlayer 104 and PMR pole 106'. FIG. 4 depicts a PMR transducer 150 formed in accordance with an exemplary embodiment of the present invention. The PMR transducer 150 may be incorporated into a merged head including a read transducer, such as the conventional PMR head 1 depicted in FIG. 1. Referring back to FIG. 4, the PMR transducer 150 includes a first pole 152 that is magnetic, an insulator 154, a first coil 160, a first coil insulator 158, insulator 156, a back gap 162, underlayer 164, flux guide 166, PMR pole 168, insulator 170, a second coil 172, and a second coil insulator 174. Although not specifically depicted, an intermediate layer (not shown) may reside between the underlayer 164 and the PMR pole 168. The first pole 152 is magnetic and preferably energized by the first coil 160. The first coil 160 surrounded by the insulator 158, which may include photoresist. The back gap 162 connects the first pole 152 with the flux guide 166. The flux guide 166 is preferably approximately 1.5 µm in thickness. The underlayer 164 corresponds to the underlayer 106' depicted in FIGS. 3A-3C. Referring back to FIG. 4, the underlayer 164 has a terminus surface 165 and a back surface opposite to the terminus surface 165. The terminus surface 165 is at substantially the level as the air-bearing surface (not shown) of a slider for a head in which the transducer 150 may be incorporated. However, the terminus surface 165 may protrude or be recessed from the air-bearing surface. In addition to being adjacent to the back of the underlayer 164, the front of the flux guide 166 is close to the terminus surface 165. In one embodiment, the front of the flux guide 166 is less than or substantially equal to 0.3 µm from the terminus surface 165. Consequently, a first portion of the PMR pole 168 lies upon the underlayer 164, while a second portion of the PMR pole 168 resides on the flux guide 166. Insulator 170 is preferably Al2O3, and insulates the second coil 172 from the PMR pole 168. The second coil 172 is also insulated using second coil insulator 174, which may be photoresist.

During fabrication, the removal rate of the PMR pole layer forming the PMR pole 168 during fabrication is less than or substantially equal to a removal rate of the underlayer 164 during the pole trim. This may result in improvements in the angle uniformity, track width uniformity, and sidewall (not shown) profile, and the efficiency of the trim process that forms the PMR pole 168. Thus, the sidewalls (not shown in FIG. 4) the PMR pole 168 may be substantially free of angles. Thus, the cross section of the PMR pole 168 is a trapezoid. In addition to being more uniform, the angle that the sidewalls make with vertical may be closer to the desired value, preferably at least approximately two degrees and less than fifteen degrees; and more preferably at least five degrees and no more than eight degrees. Moreover, there may be no footings at the base of the PMR pole 168. Consequently, performance of the PMR transducer 150 may be improved.

Figure 5:
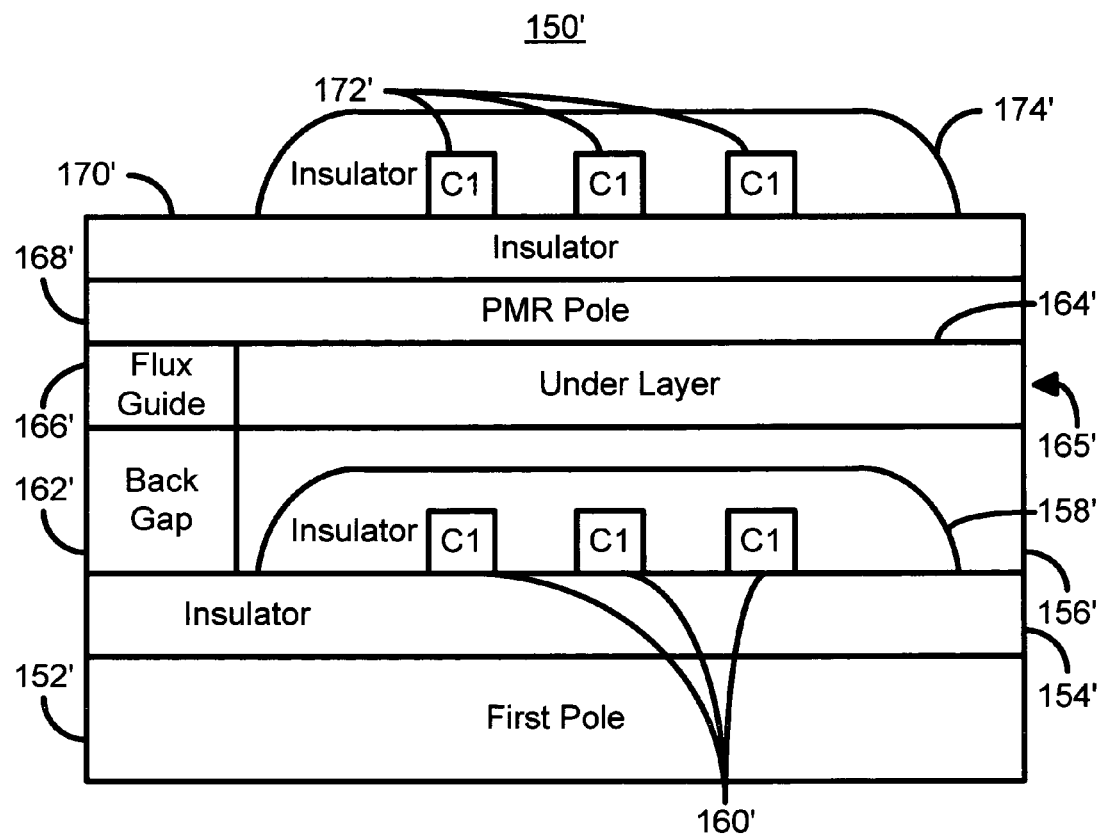
FIG. 5 depicts a perpendicular magnetic recording transducer formed in accordance with another exemplary embodiment of the present invention.

FIG. 5 depicts a PMR transducer 150' formed in accordance with another exemplary embodiment of the present invention. The PMR transducer 150' may be incorporated into a merged head including a read transducer, such as the conventional PMR head 1 depicted in FIG. 1. Referring back to FIG. 5, the PMR transducer 150' is analogous to the PMR transducer 150 depicted in FIG. 4. Consequently, components of the PMR transducer 150' are labeled similarly to the components of the PMR transducer 150. Thus, the PMR transducer 150' includes a first pole 152' that is magnetic, an insulator 143', a first coil 160', a first coil insulator 158', insulator 156', a back gap 162', underlayer 164', flux guide 166', PMR pole 168', insulator 170', a second coil 172', and a second coil insulator 174'. Although not specifically depicted, an intermediate layer (not shown) may reside between the underlayer 164 and the PMR pole 168'. The PMR transducer 150' differs from the PMR transducer 150 in that the front surface of the flux guide 166' is far from the terminus surface 165'. In one embodiment, the front of the flux guide 164 is substantially directly above the front of the back gap 162.

During fabrication, the removal rate of the PMR pole layer forming the PMR pole 168' during fabrication is less than or substantially equal to a removal rate of the underlayer 164' during the pole trim. This may result in improvements in the angle uniformity, track width uniformity, sidewall (not shown) profile, and the efficiency of the trim process that forms the PMR pole 168'. Thus, the sidewalls (not shown in FIG. 5) the PMR pole 168' may be substantially free of angles. Thus, the cross section of the PMR pole 168' is a trapezoid. In addition to being more uniform, the angle that the sidewalls make with vertical may be closer to the desired value, preferably at least approximately two degrees and less than fifteen degrees; and more preferably at least five degrees and no more than eight degrees. Moreover, footings at the base of the PMR pole 168' may be reduced or eliminated. Consequently, performance of the PMR transducer 150 may be improved. In addition, because the front of the flux guide 166' is far from the terminus surface 165' of the underlayer 164', the topology under the PMR pole 168' may be more flat than for the PMR pole 168 depicted in FIG. 4. As a result, processing of the PMR pole 168' depicted in FIG. 5 may be facilitated.

Figure 6:
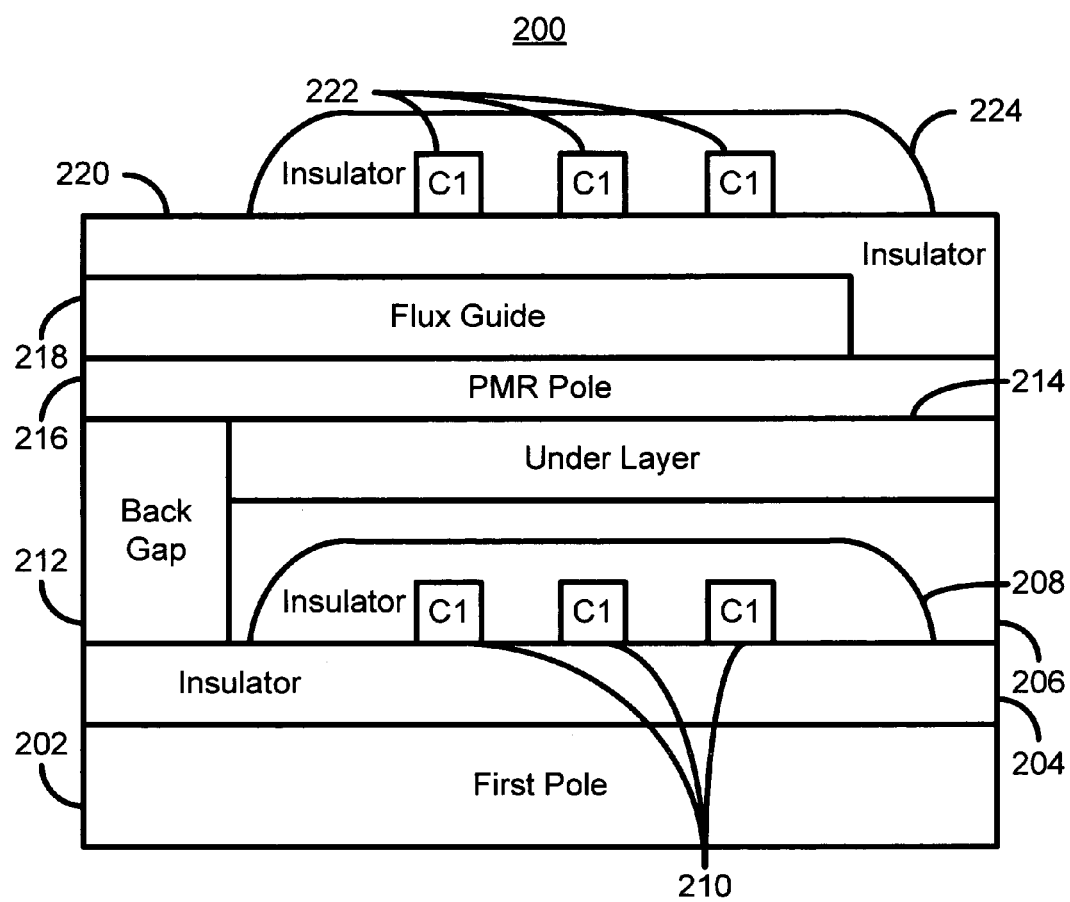
FIG. 6 depicts a perpendicular magnetic recording transducer formed in accordance with another exemplary embodiment of the present invention.

FIG. 6 depicts a perpendicular magnetic recording transducer 200 formed in accordance with another exemplary embodiment of the present invention. The PMR transducer 200 may be incorporated into a merged head including a read transducer, such as the conventional PMR head 1 depicted in FIG. 1. Referring back to FIG. 6, the PMR transducer 200 includes a first pole 202 that is magnetic, an insulator 203, a first coil 210, a first coil insulator 208, insulator 206, a back gap 212, underlayer 214, PMR pole 216, flux guide 218, insulator 220, a second coil 222, and a second coil insulator 224. Although not specifically depicted, an intermediate layer (not shown) may reside between the underlayer 214 and the PMR pole 216. The first pole 202 is magnetic and preferably energized by the first coil 210. The first coil 210 surrounded by the insulator 208, which may include photoresist. The back gap 212 connects the first pole 202 with the PMR pole 216, as well as the flux guide 218. Consequently, a portion of the flux guide 218 lies upon the PMR pole 216. In addition, the portion of the PMR pole 216 that is not on the back gap lies on the underlayer 214. The flux guide 218 is preferably approximately 1.5 µm in thickness. The underlayer 214 corresponds to the underlayer 106' depicted in FIGS. 3A-3C. Referring back to FIG. 6, the insulator 220 is preferably $Al_2O_3$, and insulates the second coil 222 from the flux guide 218 and the PMR pole 216. The second coil 222 is also insulated using second coil insulator 224, which may be photoresist.

During fabrication, the removal rate of the PMR pole layer forming the PMR pole 216 during fabrication is less than or substantially equal to a removal rate of the underlayer 214 during the pole trim. This may result in improvements in the angle uniformity, track width uniformity, and sidewall (not shown) profile, and the efficiency of the trim process that forms the PMR pole 216. Thus, the sidewalls (not shown in FIG. 6) the PMR pole 216 may be substantially free of angles. Thus, the cross section of the PMR pole 216 is a trapezoid. In addition to being more uniform, the angle that the sidewalls make with vertical may be closer to the desired value, preferably at least approximately two degrees and less than fifteen degrees; and more preferably at least five degrees and no more than eight degrees. Moreover, footings at the base of the PMR pole 216 may be reduced or eliminated. Consequently, performance of the PMR transducer 200 may be improved. In addition, because the flux guide 218 resides on top of the PMR pole 216, the topology under the PMR pole 216 may be flat. As a result, processing of the PMR pole 216 may be facilitated.

Figure 7:
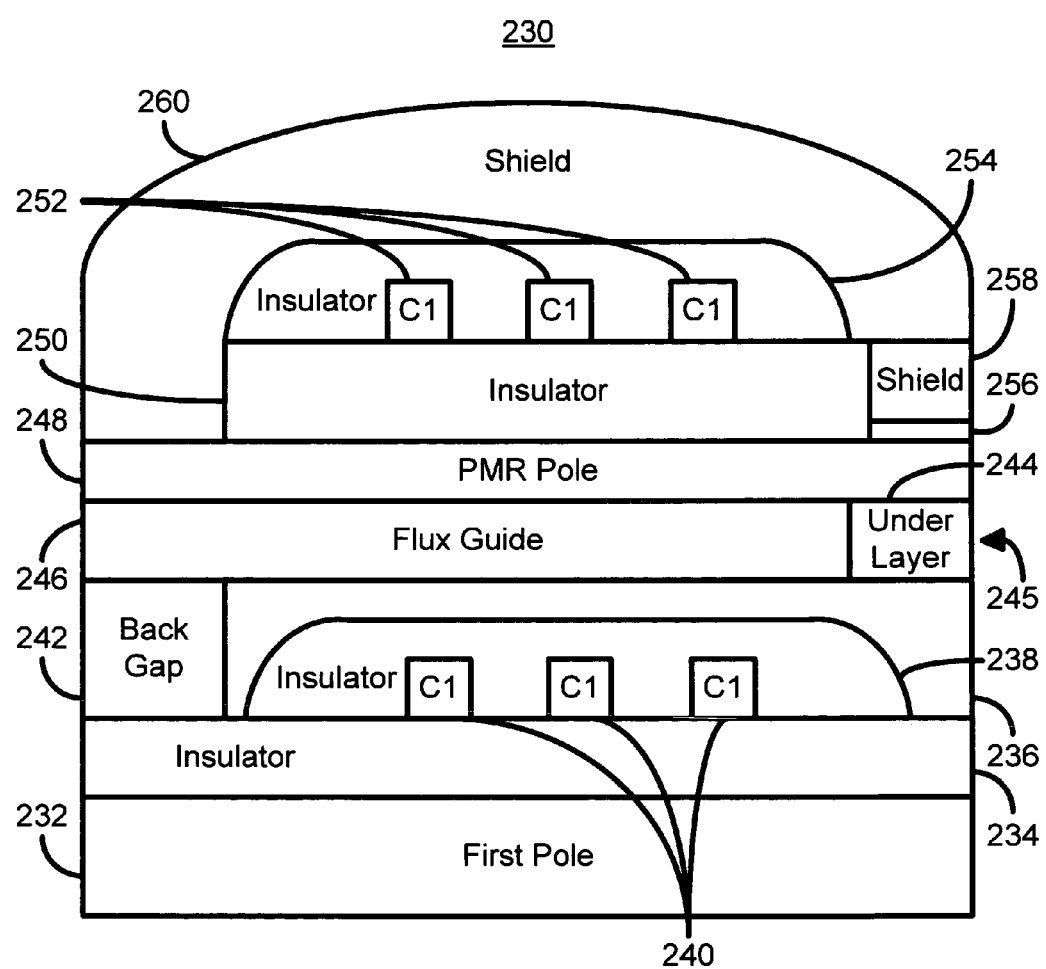
FIG. 7 depicts a perpendicular magnetic recording transducer formed in accordance with another exemplary embodiment of the present invention.

FIG. 7 depicts a perpendicular magnetic recording transducer 230 formed in accordance with another exemplary embodiment of the present invention. The PMR transducer 230 may be incorporated into a merged head including a read transducer, such as the conventional PMR head 1 depicted in FIG. 1. Referring back to FIG. 7, the PMR transducer 230 is analogous to the PMR transducer 150 depicted in FIG. 4. However, the PMR transducer 230 is a shielded transducer. Consequently, the PMR transducer 230 includes a first pole 232 that is magnetic, an insulator 234, a first coil 240, a first coil insulator 238, insulator 236, a back gap 242, underlayer 244, flux guide 246, PMR pole 248, insulator 250, a second coil 252, a second coil insulator 254, a shield gap 256, a front shield 258 and a top shield 260. Although not specifically depicted, an intermediate layer (not shown) may reside between the underlayer 244 and the PMR pole 248. The first pole 232 is magnetic and preferably energized by the first coil 240. The first coil 240 surrounded by the insulator 238, which may include photoresist. The back gap 242 connects the first pole 232 with the flux guide 246. The flux guide 246 is preferably approximately 1.5 µm in thickness. The underlayer 244 corresponds to the underlayer 106' depicted in FIGS. 3A-3C. Referring back to FIG. 7, the underlayer 244 has a terminus surface 245 and a back surface opposite to the terminus surface 245. The terminus surface 245 is at substantially the level as the air-bearing surface (not shown) of a slider for a head in which the transducer 230 may be incorporated. However, the terminus surface 245 may protrude or be recessed from the air-bearing surface. In addition to being adjacent to the back of the underlayer 244, the front of the flux guide 246 is close to the terminus surface 245. In one embodiment, the front of the flux guide 246 is less than or substantially equal to 0.3 µm from the terminus surface 245. Consequently, a first portion of the PMR pole 248 lies upon the underlayer 244, while a second portion of the PMR pole 248 resides on the flux guide 246. In an alternate embodiment (not shown), the front of the flux guide 246 may be far from the terminus surface 245, as in the PMR transducer 150' depicted in FIG. 5. In such an embodiment, the topology under the PMR pole may be more flat, thereby facilitating processing of the PMR pole. Referring back to FIG. 7, insulator 250 is preferably Al2O3, and insulates the second coil 252 from the PMR pole 248. The second coil 252 is also insulated using second coil insulator 254, which may be photoresist.

The PMR transducer 230 may share the benefits of the PMR transducer 150 depicted in FIG. 4. Referring back to FIG. 7, the PMR transducer 230 may thus exhibit improvements in the angle uniformity, track width uniformity, and sidewall (not shown) profile, and the efficiency of the trim process that forms the PMR pole 248. The sidewalls (not shown in FIG. 7) the PMR pole 248 may be substantially free of angles. Thus, the cross section of the PMR pole 248 is a trapezoid. In addition to being more uniform, the angle that the sidewalls make with vertical may be closer to the desired value, preferably at least approximately two degrees and less than fifteen degrees; and more preferably at least five degrees and no more than eight degrees. Moreover, footings at the base of the PMR pole 248 may be reduced or eliminated. Consequently, performance of the PMR transducer 230 may be improved.

Figure 8:
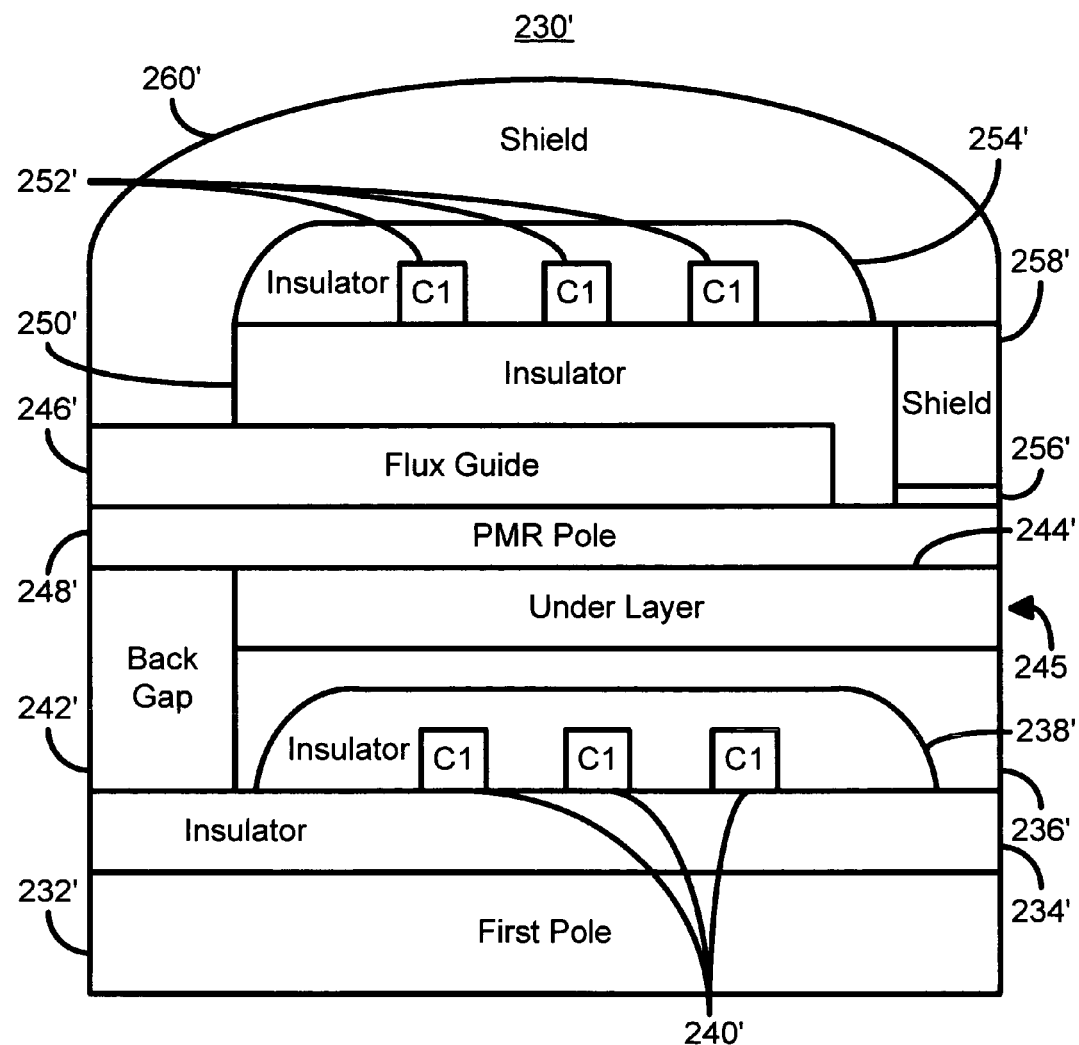
FIG. 8 depicts a perpendicular magnetic recording transducer formed in accordance with another exemplary embodiment of the present invention.

FIG. 8 depicts a perpendicular magnetic recording transducer 230' formed in accordance with another exemplary embodiment of the present invention. The PMR transducer 230' may be incorporated into a merged head including a read transducer, such as the conventional PMR head 1 depicted in FIG. 1. Referring back to FIG. 8, the PMR transducer 230' is analogous to the PMR transducer 230 depicted in FIG. 7. Consequently, components of the PMR transducer 230' are labeled similarly to the components of the PMR transducer 230. Thus, the PMR transducer 230' includes a first pole 232' that is magnetic, an insulator 234', a first coil 240', a first coil insulator 238', insulator 236', a back gap 242', underlayer 244', flux guide 246', PMR pole 248', insulator 250', a second coil 252', a second coil insulator 254', a shield gap 256', a front shield 258' and a top shield 260'. Although not specifically depicted, an intermediate layer (not shown) may reside between the underlayer 244' and the PMR pole 248'. However, the flux guide 246' in the PMR transducer 230' resides on top of the PMR pole 248'.

The PMR transducer 230' may share the benefits of the PMR transducer 230 depicted in FIG. 7. Referring back to FIG. 8, the PMR transducer 230' may thus exhibit improvements in the angle uniformity, track width uniformity, and sidewall (not shown) profile, and the efficiency of the trim process that forms the PMR pole 248'. The sidewalls (not shown in FIG. 8) the PMR pole 248' may be substantially free of angles. Thus, the cross section of the PMR pole 248' is a trapezoid. In addition to being more uniform, the angle that the sidewalls make with vertical may be closer to the desired value, preferably at least approximately two degrees and less than fifteen degrees; and more preferably at least five degrees and no more than eight degrees. Moreover, footings at the base of the PMR pole 248' may be reduced or eliminated. In addition, because the flux guide 248' resides on top of the PMR pole 246', the topology under the PMR pole 246' may be flat. As a result, processing of the PMR pole 246' may be facilitated. Consequently, performance and processing of the PMR transducer 230' may be improved.

Figure 9:
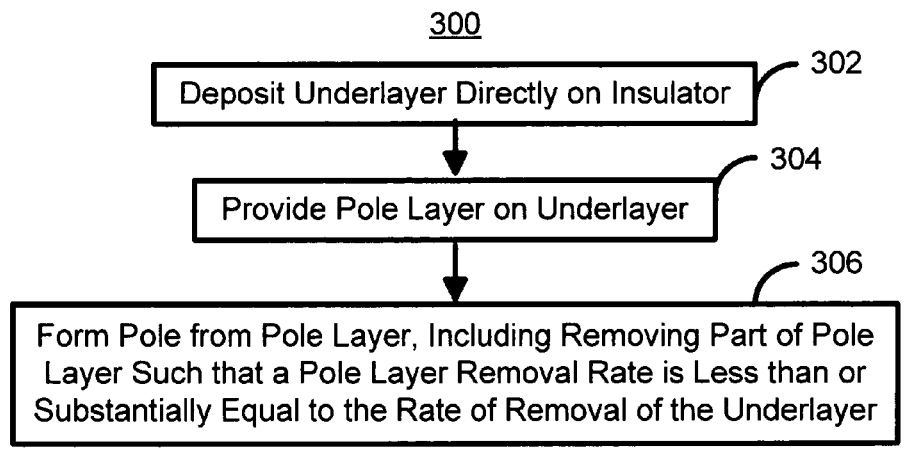
FIG. 9 is a flow chart depicting one embodiment of a method in accordance with the present invention for fabricating a perpendicular magnetic recording pole in accordance with an exemplary embodiment of the present invention.

FIG. 9 is a flow chart depicting one embodiment of a method 300 in accordance with the present invention for fabricating a PMR pole in accordance with an exemplary embodiment of the present invention. The method 300 may be utilized in fabricating the PMR poles 106', 168, 168', 216, 248, and 248'. One of ordinary skill in the art will also readily recognize that other and/or additional steps not inconsistent with the present invention may be included in the method 300. However, for clarity, the method 300 is described in the context of fabricating the PMR pole 106' depicted in FIGS. 3B-3C. However, the method 300 may be used to make other PMR transducers (not shown).

Referring to FIGS. 9 and 3A-3C, the underlayer 104 is deposited directly on the insulator 102, via step 302. As described above, the underlayer 104 is preferably a nonferromagnetic metal, silicon oxide, and silicon nitride. A pole layer 106 is provided on the underlayer 104, via step 304. The PMR pole 106' is formed from the pole layer 106, via step 306. Step 306 includes removing a portion of the pole layer 106 such that a pole removal rate for the pole layer 106 is less than or substantially equal to a removal rate of the underlayer 104 during the removal. Step 306 also preferably includes depositing the pole layer 106, providing the CMP stop layer 108 and the hard mask 110, and forming the mask 112. Thus, the PMR pole 106' formed using step 306 has a top and a bottom narrower than the top.

Because step 306 removes the pole layer 106 such that its pole removal rate is less than or substantially equal to the removal rate of the underlayer 104, the PMR pole 106' may have improved angle uniformity, track width uniformity, and sidewall profile, and the efficiency of the trim process that forms the PMR pole 108'. Consequently, using the method 300, the performance and fabrication of PMR poles, such as the PMR pole 106' may be improved.

Figure 10:
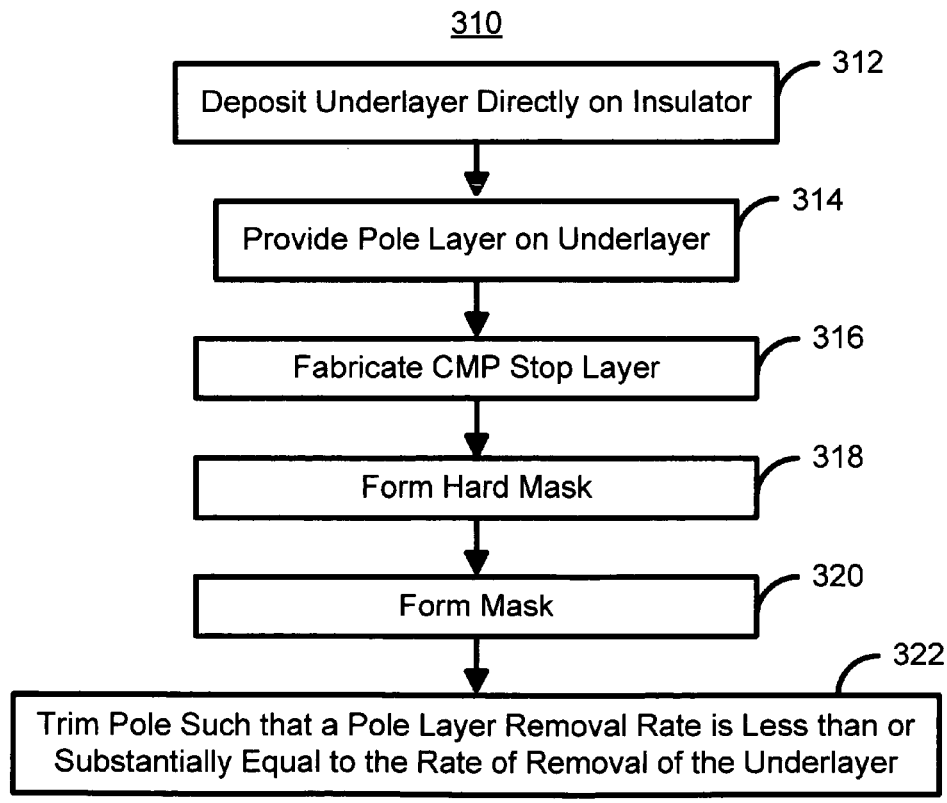
FIG. 10 is a flow chart depicting one embodiment of a method in accordance with the present invention for fabricating a perpendicular magnetic recording pole in accordance with another exemplary embodiment of the present invention.

FIG. 10 is a flow chart depicting one embodiment of a method 310 in accordance with the present invention for fabricating a PMR pole in accordance with an exemplary embodiment of the present invention. The method 310 may be utilized in fabricating the PMR poles 106', 168, 168', 216, 248, and 248' as well as other embodiments (not shown). One of ordinary skill in the art will also readily recognize that other and/or additional steps not inconsistent with the present invention may be included in the method 300. However, for clarity, the method 310 is described in the context of fabricating the PMR pole 106' depicted in FIGS. 3B-3C. However, the method 310 may be used to make other PMR transducers (not shown).

Referring to FIGS. 10 and 3A-3C, the underlayer 104 is deposited directly on the insulator 102, via step 312. As described above, the underlayer 104 includes at least one of nonferromagnetic metal, silicon oxide, and silicon nitride. A pole layer 106 is provided on the underlayer 104, via step 314. The CMP step layer 108 is fabricated, via step 316. The hard mask 110 is formed on the CMP stop layer 108, via step 318. The mask 112 is formed, via step 320. Thus, step 320 includes providing the materials for the mask 112, as well as patterning the material. The pole layer 106 is trimmed to form the PMR pole 106', via step 322. Step 322 includes removing a portion of the pole layer 106 such that a pole removal rate for the pole layer 106 is less than or substantially equal to a removal rate of the underlayer 104 during the removal. Thus, the PMR pole 106' formed using step 333 has a top and a bottom narrower than the top.

Because step 322 removes the pole layer 106 such that its pole removal rate is less than or substantially equal to the removal rate of the underlayer 104, the PMR pole 106' may have improved angle uniformity, track width uniformity, and sidewall profile, and the efficiency of the trim process performed in step 322. Consequently, using the method 310, the performance and fabrication of PMR poles, such as the PMR pole 106' may be improved.

Figure 11:
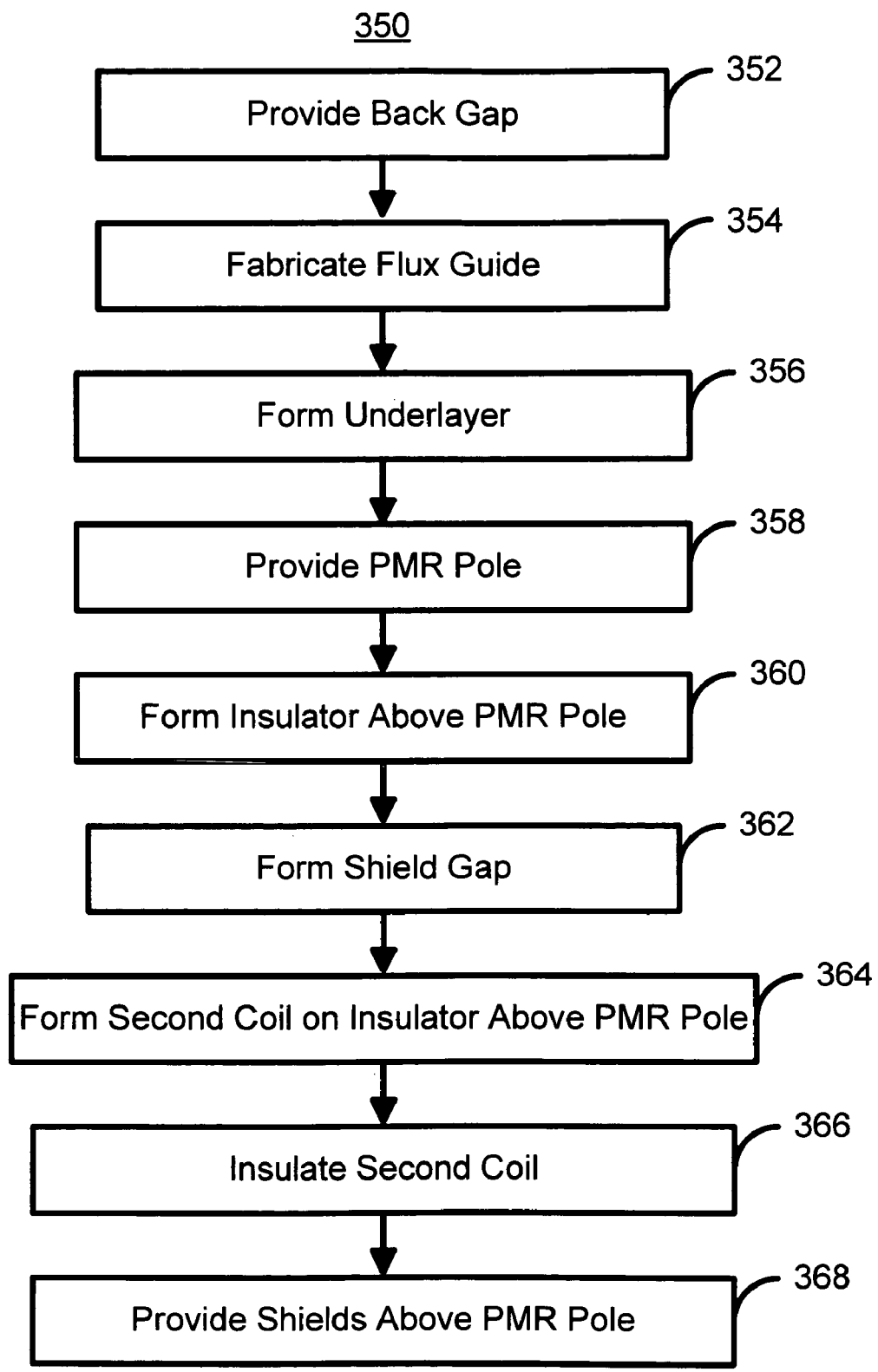
FIG. 11 is a flow chart depicting a method for providing a perpendicular magnetic recording transducer in accordance with an exemplary embodiment of the present invention.

FIG. 11 is a flow chart depicting a method 350 for providing a PMR transducer in accordance with an exemplary embodiment of the present invention. The method 300 may be utilized in fabricating the PMR transducer 150, 150', 200, 230, and 230', as well as other embodiments (not shown). However, for clarity, the method 350 is described in the context of fabricating the PMR pole 230 depicted in FIG. 7. The method 350 commences after the first pole 232, the insulator 234, coil 240, and insulators 236 and 238 have been provided.

The back gap 242 is provided, via step 352. The flux guide 246 is fabricated, via step 354. The underlayer 244 is also formed, via step 356. Depending upon the PMR transducer 150, 150', 200, 230, and 230' being formed, the underlayer may be formed with its front surface either close to or far from the terminus surface of the underlayer. The PMR pole 248 is provided, via step 358. Step 358, is preferably performed using the method 300 or 310. Note that depending upon the PMR transducer 150, 150', 200', 230', and 230' being formed, the flux guide may be formed on the PMR pole. Consequently, in some embodiments, step 358 may be performed prior to step 354. The insulator 250 is formed, via step 360. At least a portion of the insulator 250 resides on the underlayer 248. In embodiments in which the flux guide is formed on the PMR pole, a portion of the insulator resides on the flux guide. The shield gap 256 may then be formed, via step 362. The coil 252 is formed on the insulator 250, via step 364. The coil 252 is insulated by providing insulator 254, via step 366. The portions of the shield 258 and 260 may then be provided for a shielded head 230, via step 368.

Because step 358 removes the pole layer such that its pole removal rate is less than or substantially equal to the removal rate of the underlayer 244, the PMR pole 248 may have improved angle uniformity, track width uniformity, and sidewall profile, and the efficiency of the trim process performed in step 358. Consequently, using the method 350, the performance and fabrication of PMR poles, such as the PMR pole 248 may be improved.

We claim:

1. A method for manufacturing a perpendicular magnetic recording transducer comprising:
   depositing an underlayer directly on an insulating layer, the underlayer including at least one of a nonferromagnetic metal, silicon oxide and silicon nitride;
   providing a pole layer on the underlayer; and
   forming a perpendicular magnetic recording pole from the pole layer, the perpendicular magnetic recording pole having a top, a bottom narrower than the top, the forming further including
   removing a portion of the pole layer, a pole removal rate for the pole layer being less than or substantially equal to a removal rate of the underlayer during the removing.

2. The method of claim 1 wherein the underlayer depositing further includes:
   depositing at least one of NiNb, Ru, Rh, NiFeCr, silicon oxide, and silicon nitride.

3. The method of claim 1 wherein the underlayer depositing further includes:
   depositing a laminate having a plurality of layers including at least one of NiNb, Ru, Rh, and NiFeCr.

4. The method of claim 1 further comprising:
   depositing an intermediate layer between the underlayer and the pole layer, the intermediate layer having a thickness of not more than one thousand Angstroms.

5. The method of claim 4 wherein the intermediate layer has a thickness of not more than one hundred Angstroms.

6. The method of claim 4 wherein the underlayer includes NiNb/Ta and wherein the intermediate layer includes Ta.

7. The method of claim 4 wherein the perpendicular magnetic recording pole has pole a thickness and wherein the underlayer depositing further includes:
   depositing the underlayer at the thickness substantially equal to the pole thickness.

8. The method of claim 1 wherein the underlayer depositing further includes:
   depositing the underlayer at a thickness of at least five hundred Angstroms.

9. The method of claim 1 further comprising:
   fabricating a chemical mechanical planarization (CMP) stop layer on the pole layer prior to the forming step.

10. The method of claim 9 further comprising:
    fabricating hard mask layer on the CMP stop layer prior to the forming step.

11. The method of claim 10 further comprising:
    creating a mask on the hard mask layer prior to the forming step.

12. The method of claim 11 wherein the mask creating further includes:
    forming a photoresist mask on the hard mask layer.

13. The method of claim 11 wherein the mask creating further includes:
    forming a hard mask on the hard mask layer.

14. The method of claim 13 wherein the hard mask includes NiFe.

15. The method of claim 11 wherein the removing further includes:
    removing a portion of the hard mask layer and a portion of the CMP stop layer.

16. The method of claim 15 wherein the forming further includes:
    performing a pole trim to provide the perpendicular magnetic recording pole.

17. The method of claim 1 wherein the underlayer has a back and a terminus surface, the method further comprising:
    providing a flux guide having a front adjacent to the underlayer, a second portion of the perpendicular magnetic recording pole being on the flux guide.

18. The method of claim 17 further comprising:
    providing a back gap under a portion of the flux guide distant from the front of the flux guide and from the terminus surface of the underlayer.

19. The method of claim 1 wherein the underlayer has a back and a terminus surface, the method further comprising:
    providing a flux guide residing on a second portion of the perpendicular magnetic recording pole.

20. The method of claim 1 further comprising:
    providing a shield gap on a second portion of the flux guide; and
    providing a shield above the shield gap.

21. The method of claim 20 wherein the underlayer has a back and a terminus surface, method further comprising:
    providing a flux guide having a front adjacent to the underlayer, a second portion of the perpendicular magnetic recording pole being on the flux guide.

22. The method of claim 20 wherein the underlayer has a back and a terminus surface, the method further comprising:
    providing a flux guide residing on a second portion of the perpendicular magnetic recording pole.

23. The method of claim 1 wherein the perpendicular magnetic recording pole has a side, the side substantially forming a plane.

24. The method of claim 1 wherein the perpendicular magnetic recording pole has a side, the side having an angle with respect to a vertical direction that is nonzero and at least two degrees.

25. The method of claim 24 wherein the angle is at least five degrees and not more than eight degrees.

26. The method of claim 1 wherein the underlayer includes the nonferromagnetic metal.

* * * * *